United States Patent
Oh et al.

(10) Patent No.: US 6,189,051 B1
(45) Date of Patent: Feb. 13, 2001

(54) SYSTEM AND METHOD FOR MANUFACTURING HARD DISK MASTER BY DOWNLOADING SELECTED PROGRAMS AND DRIVERS FROM A HOST THROUGH A NETWORK

(75) Inventors: Chang-kook Oh, Suwon; Eun-young Lee, Seoul, both of (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/081,011

(22) Filed: May 19, 1998

(30) Foreign Application Priority Data

May 19, 1997 (KR) .................................................. 97-19317

(51) Int. Cl.⁷ ...................................................... G06F 13/38
(52) U.S. Cl. ............................. 710/33; 710/31; 710/129; 709/203; 709/208; 709/218; 709/219; 717/11
(58) Field of Search ................................ 710/31, 33, 129; 709/201, 203, 208; 717/11; 395/712

(56) References Cited

U.S. PATENT DOCUMENTS

| 5,519,882 | 5/1996 | Asano et al. . |
| 5,572,659 | 11/1996 | Iwasa et al. . |
| 5,583,994 | 12/1996 | Rangan . |
| 5,592,626 | 1/1997 | Papadimitriou et al. . |
| 5,604,906 * | 2/1997 | Murphy et al. ..................... 717/11 |
| 5,652,614 | 7/1997 | Okabayashi . |
| 5,664,186 | 9/1997 | Bennett et al. . |
| 5,745,756 | 4/1998 | Henley . |
| 5,794,052 * | 8/1998 | Harding ............................ 717/11 |
| 5,887,060 * | 3/1999 | Ronning .............................. 380/4 |
| 5,915,264 * | 6/1999 | White et al. ...................... 711/168 |
| 5,953,532 * | 9/1999 | Lochbaum ......................... 717/11 |

* cited by examiner

Primary Examiner—Thomas C. Lee
Assistant Examiner—Thuan Du
(74) Attorney, Agent, or Firm—Robert E. Bushnell, Esq.

(57) ABSTRACT

A system and method for manufacturing a hard disk master for copying a hard disk are provided. The manufacturing system includes a server computer and a client computer for logging in on the server computer and generating the hard disk master. The server computer includes a program storing portion for storing programs and drivers, a user interfacing portion for selecting the programs and drivers required by the hard disk master and for storing the selected programs and drivers, a setup file generating portion for generating information on the selected programs and an order in which the programs and drivers are installed, and a script file generating portion for generating information on the setting of the hardware environment and operating conditions. The client computer includes a downloading portion for downloading the selected programs and drivers and the setup file, and a hard disk master generating portion for sequentially installing the programs and drivers required by the hard disk master by executing the setup file.

20 Claims, 8 Drawing Sheets

| CLASSIFICATION | KIND | FILE |
|---|---|---|
| OPERATING SYSTEM | WINDOW 95<br>WINDOW NT<br>OS2<br>⋮ | CORRESPONDING FILE<br>⋮ |
| DRIVER | SOUND DRIVER<br>VIDEO DRIVER<br>⋮ | CORRESPONDING FILE<br>⋮ |
| SYSTEM UTILITY | MODEM<br>CD-ROM<br>DVD-ROM<br>⋮ | CORRESPONDING FILE<br>⋮ |
| APPLICATION PROGRAM | MS-WORD<br>MS-EXCEL<br>HUN<br>⋮ | CORRESPONDING FILE<br>⋮ |

*Fig. 3*

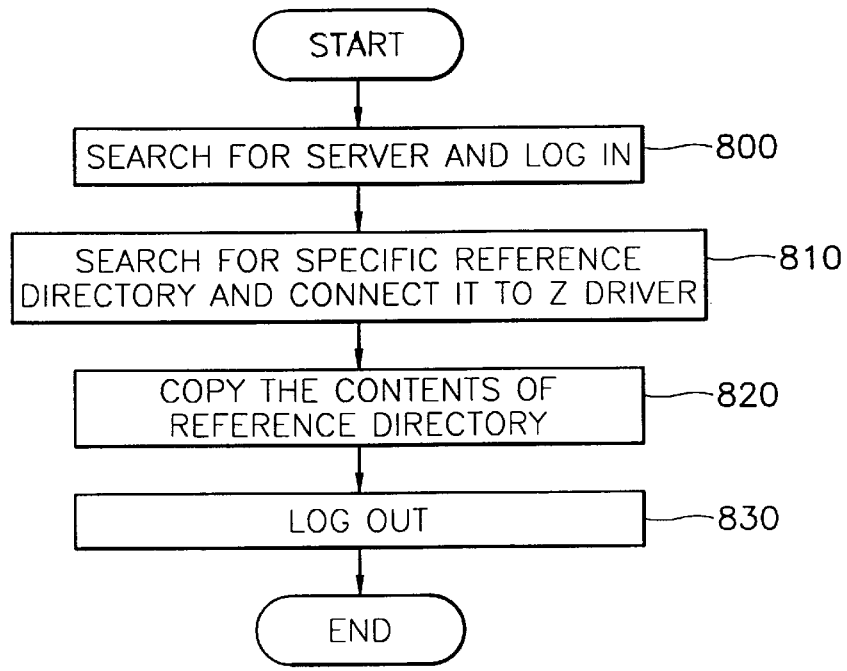
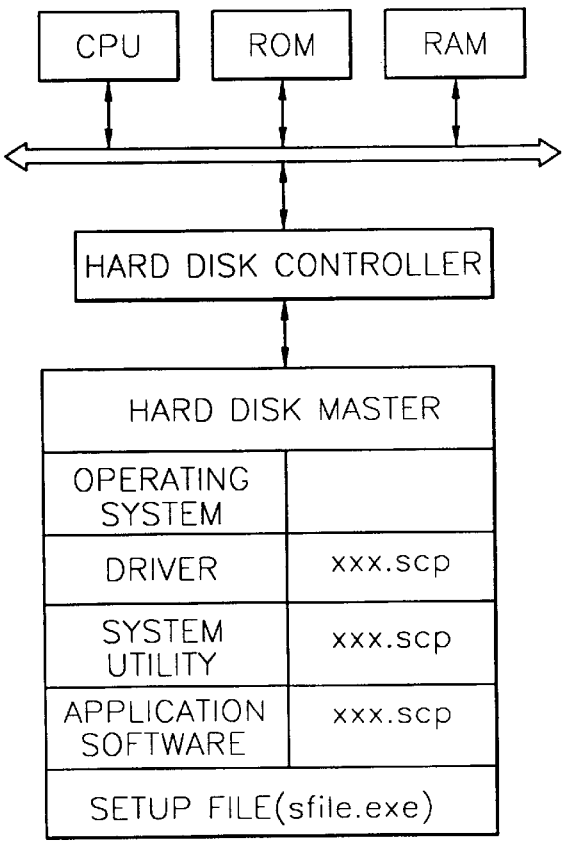

SYSTEM AND METHOD FOR MANUFACTURING HARD DISK MASTER BY DOWNLOADING SELECTED PROGRAMS AND DRIVERS FROM A HOST THROUGH A NETWORK

CLAIM OF PRIORITY

This application makes reference to, incorporates the same herein, and claims all benefits accruing under 35 U.S.C. §119 from an application entitled SYSTEM FOR MANUFACTURING HARD DISK MASTER AND METHOD THEREFOR earlier filed in the Korean Industrial Property Office on May 19, 1997, and there duly assigned Serial No. 97-19317 by that Office.

BACKGROUND OF THE INVENTION

1. Technical Field

The present invention relates to manufacturing of a hard disk master and, more particularly, to a system and method for manufacturing a hard disk master.

2. Related Art

In general, a hard disk is used for a computer system as an auxiliary storage device. The hard disk is controlled by a hard disk controller. Programs required by a user such as an operating system for operating the computer system, various device drivers, a system utility, and application software are stored in the hard disk.

When a computer system is sold to a consumer, the hard disk in which the programs are stored is installed therein. Therefore, it is necessary for a computer manufacturer to copy programs into the hard disk of the computer.

Since the installation of programs and the setting of the environment are manually performed, there is a high possibility of occurrence of errors, and much time is required for installing the programs. Also, in prior methods, effective and collective management is difficult to perform since the management of the versions of the application programs and drivers is performed with respect to diskettes or compact disks (CD). Namely, according to the prior technology, the possibility of occurrence of errors is high due to the manual nature of the work, and the programs and drivers cannot be effectively managed.

The following patents are considered to be representative of the prior art, and are burdened by the disadvantages set forth herein: U.S. Pat. No. 5,745,756 entitled Method And System For Managing Movement Of Large Multi-Media Data Files From An Archival Storage To An Active Storage Within A Multi-Media Server Computer System issue to Henley, U.S. Pat. No. 5,664,186 entitled Computer File Management And Backup System issued to Bennett et al., U.S. Pat. No. 5,652,614 entitled Video Server Apparatus Comprising Optical Disks, Hard Disk Drive And Main Memory issued to Okabayashi, U.S. Pat. No. 5,592,626 entitled System and Method for Selecting Cache Server Based on Transmission And Storage Factors For Efficient Delivery Of Multimedia Information In A Hierarchical Network OfServers issued to Papadimitriou et al., U.S. Pat. No. 5,583,994 entitled System for Efficient Delivery of Multimedia Information Using Hierarchical Network ofServers Selectively Caching Program For A Selected Time Period issued to Rangan, U.S. Pat. No. 5,572,659 entitled Adapter For Constructing A Redundant Disk Storage System issued to Iwasa et al., and U.S. Pat. No. 5,519,882 entitled System For Configuring A Disk Drive As A Master Or Slave by Either Cable Or Local Selection With Only One Jumper Block or One Switching Device issued to Asano et al.

SUMMARY OF THE INVENTION

It is an object of the present invention to provide a system and method for manufacturing a hard disk master by which it is possible to reduce the probability of generating errors during the manufacturing of the hard disk master by manual work, and to effectively manage programs and drivers stored in the hard disk master which may differ according to the model.

To achieve the above object, there is provided a hard disk master manufacturing system for manufacturing a hard disk master for copying a hard disk loaded in a computer system. The system comprises a server computer for storing programs and drivers to be stored in the hard disk, and a client computer for logging in on the server computer for downloading from the server the programs and drivers required by the hard disk master to be manufactured so as to generate the hard disk master.

The server computer comprises: a program storing portion for storing the programs and drivers to be stored in the hard disk; a user interfacing portion for providing a user interface for selecting the programs and drivers required by the hard disk master from among the programs and drivers stored in the program storing portion and for storing the selected programs and drivers; a setup file generating portion for generating information on the list of the programs selected through the user interfacing portion and an order in which the programs and drivers are installed as a predetermined file; and a script file generating portion for generating information on the setting of the hardware environment and operating conditions in order to operate the selected programs and drivers.

The client computer comprises: a downloading portion for logging in on the server computer so as to download the selected program and driver stored in the user interfacing portion and the setup file generated in the setup file generating portion; and a hard disk master generating portion for sequentially installing the programs and drivers required by the hard disk master by executing the setup file.

The program storing portion is a data base for storing and managing the programs and drivers to be stored in the hard disk. The server computer further comprises a script file generating portion for generating information on the setting of hardware environment and operating conditions as a predetermined file in order to operate the selected programs and drivers. The downloading portion of the client computer further downloads the script file generated in the script file generating portion. The hard disk master generating portion further sets the environment with reference to the information stored in the script file generated in the script file generating portion.

In addition, there is provided a method for manufacturing a hard disk master in a hard disk master manufacturing system which includes a server computer for storing the programs and drivers to be stored in the hard disk and a client computer for generating the hard disk master. The client computer logs in on the server computer, and the method comprises the steps of: selecting the programs and drivers required by the hard disk master from the server computer and storing them; generating information on the list and installation order of the selected programs and drivers as a setup file; generating environment setting information for setting the hardware environment and operating conditions of the selected programs and drivers as a script file; downloading the selected programs and drivers, the setup file and the script file from the server computer to the client computer; and generating a hard disk master by executing the setup file, installing the programs and drivers in a predetermined order, and setting the environment of the programs and drivers so as to meet the hardware environment and operating conditions with reference to the script file in the client computer.

BRIEF DESCRIPTION OF THE DRAWING(S)

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 block diagram showing the structure of a general computer system in which a hard disk is used, as a general auxiliary storage device;

FIG. 3 shows an example of image program data stored in the hard disk master;

FIG. 8 is a flowchart showing the processes of logging a server computer in on a client computer, searching a reference directory, and copying the reference directory; and FIG. 9 shows the structure of the hard disk master when a set up file is executed, and the hard disk master is manufactured with reference to a script file.

DESCRIPTION OF THE PREFERRED EMBODIMENT(S)

Figure 5:
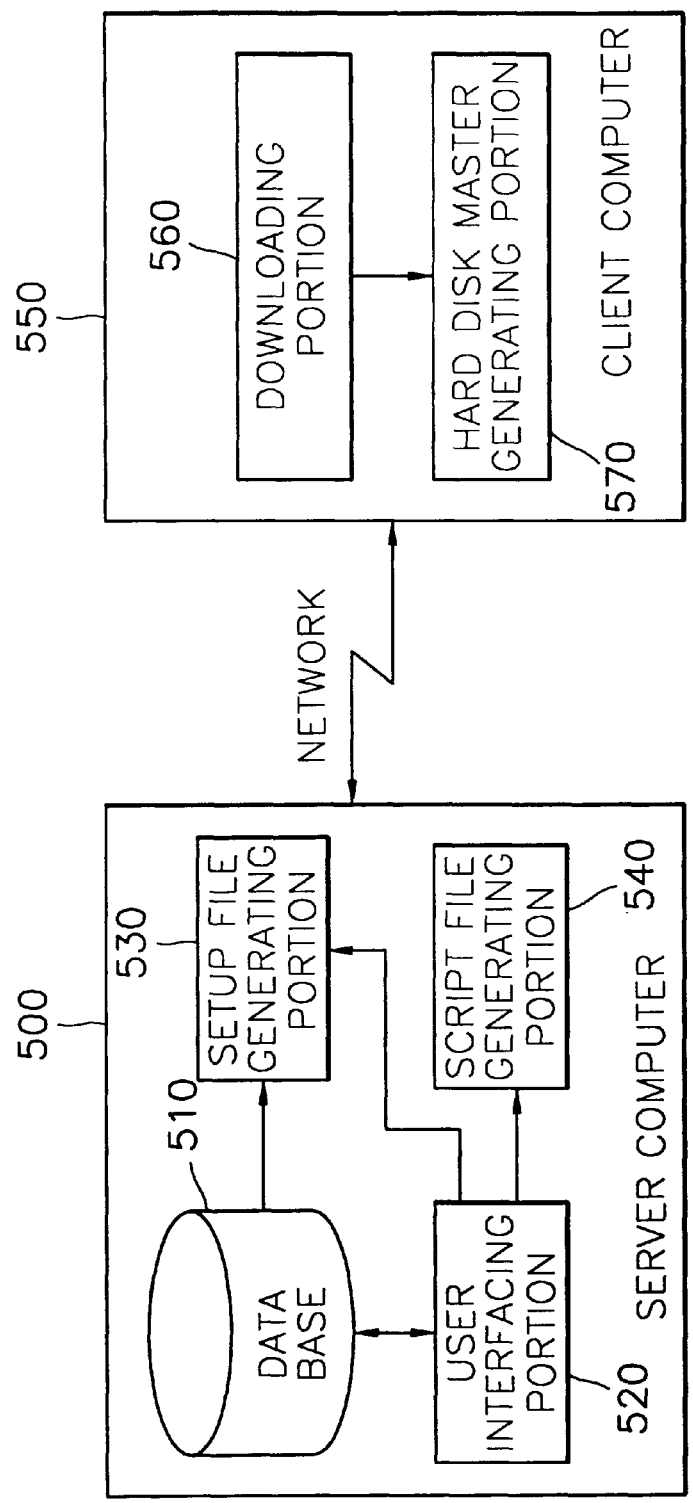
FIG. 5 is a block diagram showing the structure of a system for manufacturing a hard disk master according to the present invention.

Hereinafter, the present invention will be described in detail with reference to the attached drawings. FIG. 5 is a block diagram showing the structure of a system for manufacturing a hard disk master according to the present invention. The system includes a server computer 500 for storing programs and drivers to be stored in a hard disk and a client computer 550 for generating a hard disk master by receiving the programs and drivers to be manufactured, as downloaded from the server computer 500 after logging in on the server computer 500 via a network.

Figure 1:
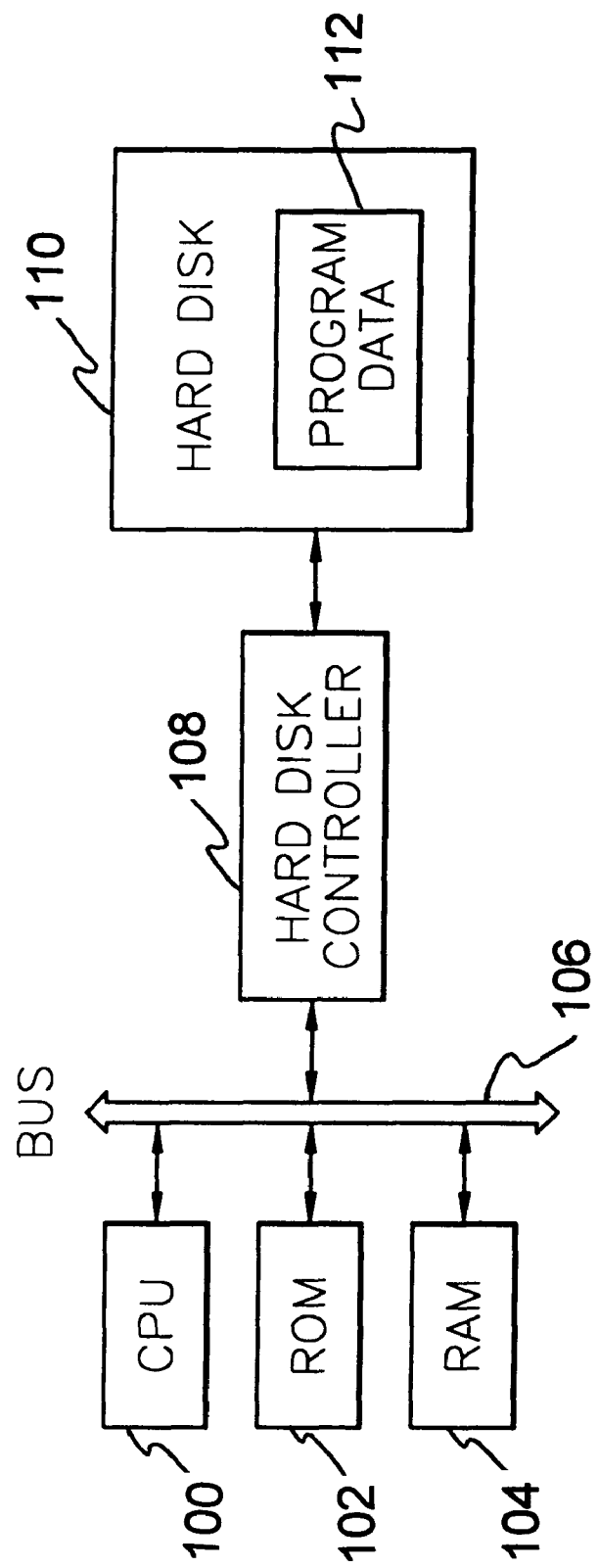

FIG. 1 is a block diagram showing the structure of a general computer system in which a hard disk is used as general auxiliary storage device. The structure of the general computer system includes a central processing unit (CPU) 100, a read-only memory (ROM) 102, and a random access memory (RAM) 104, the latter elements being connected by a system bus 106 to a hard disk controller 108. The hard disk controller 108 is connected to and controls a hard disk 110, the hard disk 110 including (among other things) program data 112.

Figure 2:
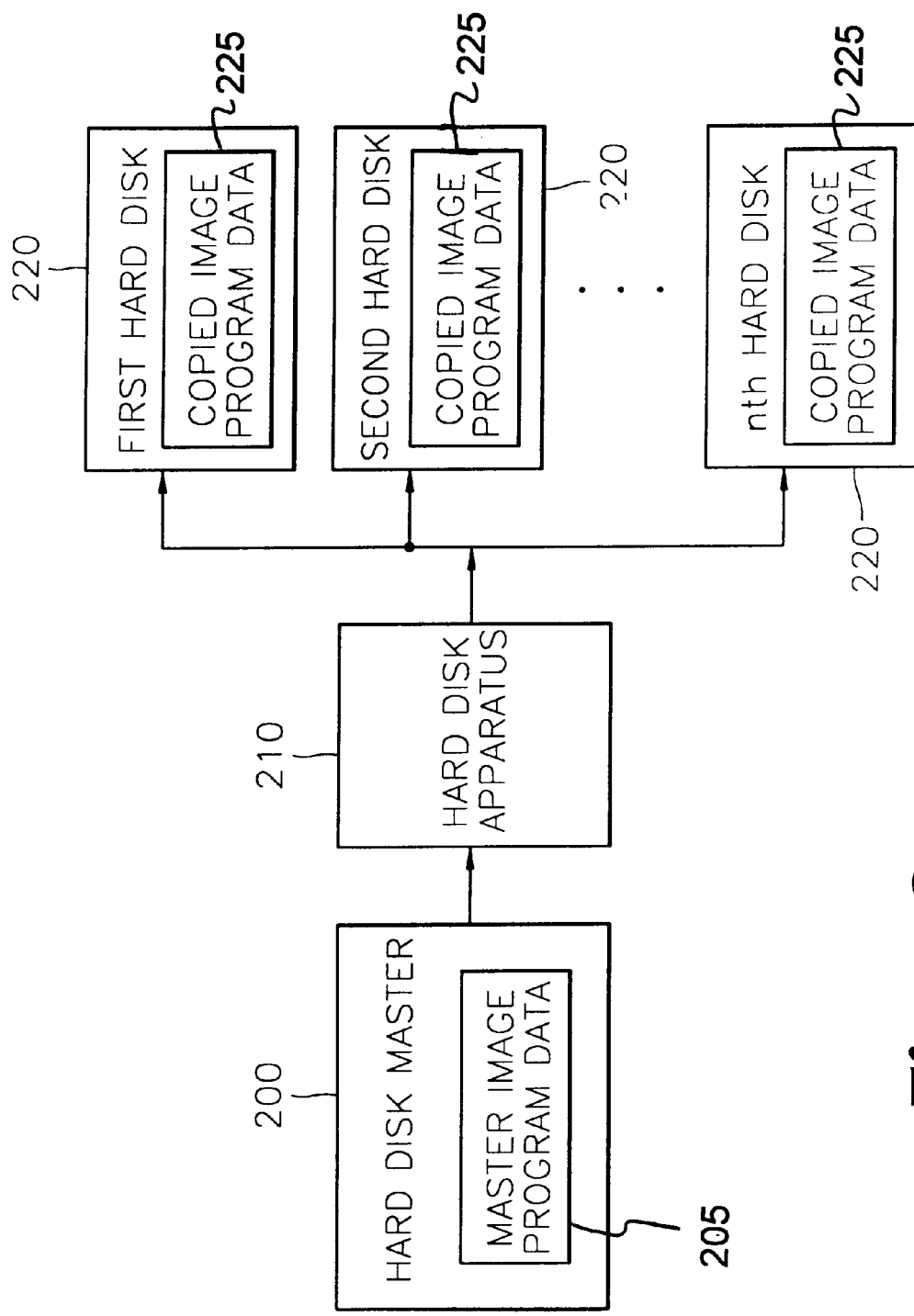
FIG. 2 shows the state of a system for copying programs into the hard disk of a computer.

FIG. 2 shows the state of system for copying programs into the hard disk of a computer.

The system includes a hard disk master 200 in which programs to be copied or master image program data 205 are stored, a hard disk copying apparatus 210 for copying the programs 205 stored in the hard disk master 200 into new hard disks 220 to be installed in computer systems, and a plurality of hard disks 220 installed in the computer systems for storing image program data 225 which has been copied from the programs 205 stored in the hard disk master 200. The contents of the hard disk master 200 may differ as necessary since the programs to be used and the devices to be installed may differ according to the computer models involved.

Figure 4:
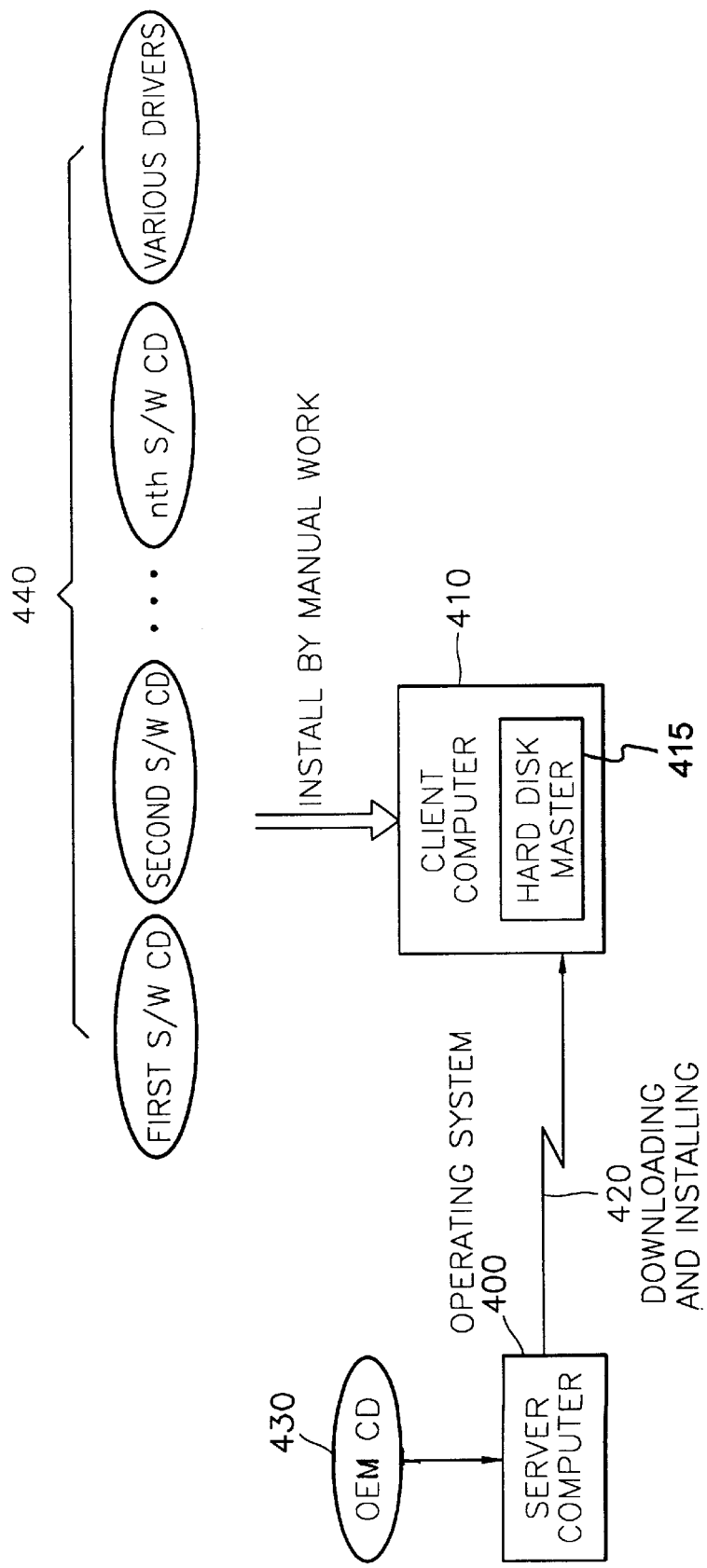
FIG. 4 shows the structure of a general system for manufacturing a hard disk master for a computer manufacturer to copy a hard disk loaded in a computer system.

FIG. 3 shows an example of the image program data stored in the hard disk master, while FIG. 4 shows the structure of a system for manufacturing the hard disk master in order to copy the master programs to a hard disk in a computer system. A conventional hard disk master is manufactured by installing an operating system program (e.g., WINDOWS) in a server computer 400 using a compact disk (CD) 430. The WINDOWS program is downloaded from the server computer 400 through a network 420, and is automatically installed in a client computer 410. A hard disk master 415 is created by manually installing application programs and drivers 440 in the client computer 410, and by setting a required environment. During the setting of the environment, computer hardware and operating conditions are set in order to operate the programs and device drivers stored in the hard disk master.

Figure 7:
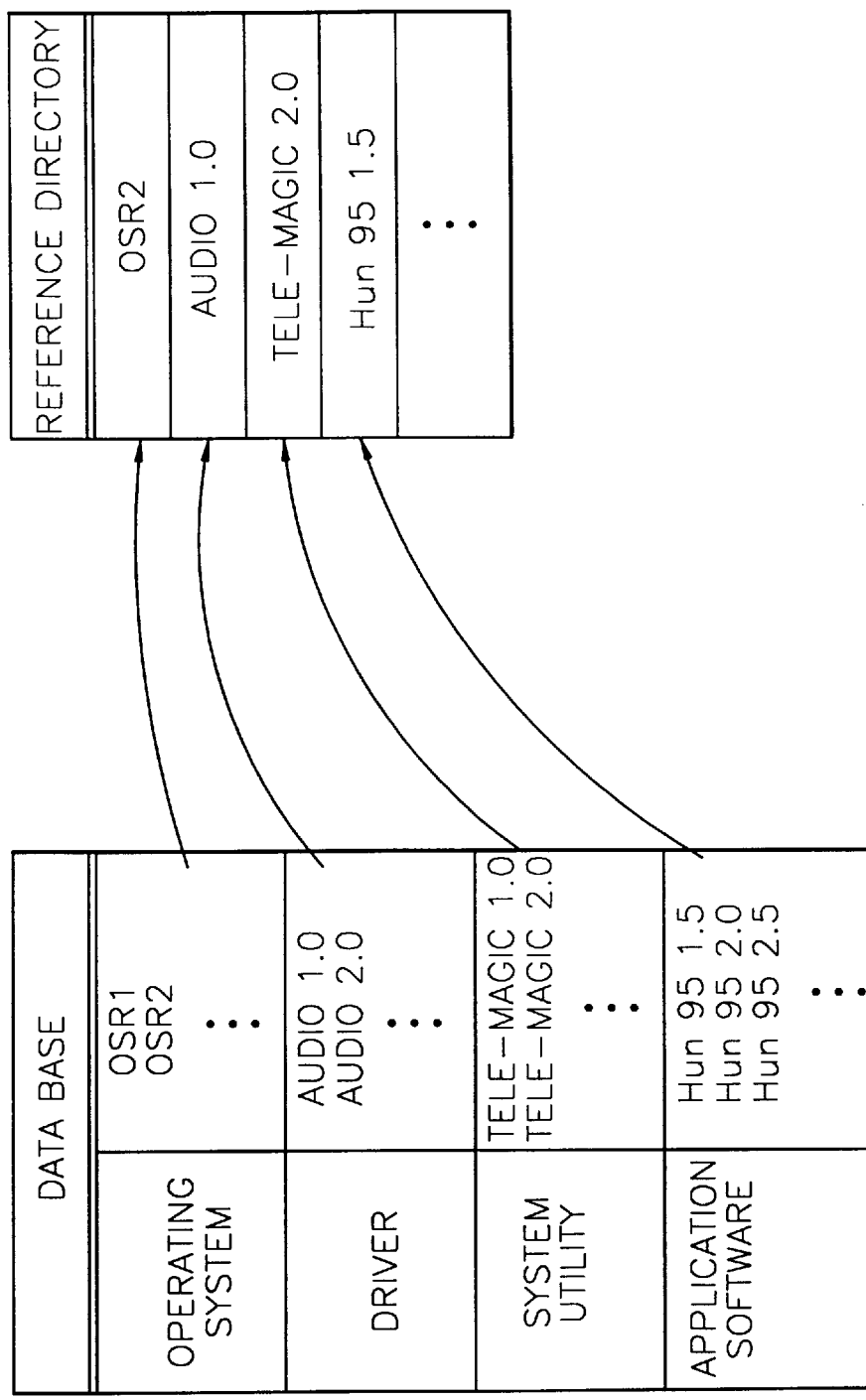
FIG. 7 shows a reference directory for managing the versions of programs and drivers which may differ according to the model of a computer system, and for copying required programs and drivers.

FIG. 7 shows a reference directory for managing the versions of programs and drivers which may differ according to the model of a computer system, and for copying required programs and drivers.

The server computer 500 (FIG. 5) includes a data base 510, a user interfacing portion 520, a setup file generating portion 530, and a script file generating portion 540. The data base 510 stores and manages the programs and drivers to be stored in the hard disk. The programs and drivers are managed according to the versions thereof since they may differ according to the model of a computer system as shown in FIG. 7.

The user interfacing portion 520 provides a user interface for selecting the programs and drivers required by the hard disk master from among the programs and drivers managed by the data base 510, and stores the selected programs and drivers by assigning additional memory. In the embodiment of the present invention, programs which can be selected in a menu manner under a graphic user interface environment (GUI) for selecting the programs and drivers are used. The selected programs and drivers are temporarily stored in an additional reference directory.

The setup file generating portion 530 generates information on the list of programs selected by the user interfacing portion 520 and the order in which the programs and drivers are installed as a setup file which can be executed. The script file generating portion 540 generates information on the setting of the hardware environment and operating conditions as a script file in order to let the selected programs and drivers operate. The script file is preferably written in script language and is a text file.

The client computer 550 includes a downloading portion 560 and a hard disk master generating portion 570. The downloading portion 560 logs in on the server computer 500, and downloads the selected programs and drivers stored in the reference directory of the user interfacing portion 520, the setup file generated in the setup file generating portion 530, and the script file generated in the script file generating portion 540. The hard disk master generating portion 570 executes the setup file, sequentially installs the programs and drivers required by the hard disk master to be manufactured in the hard disk master, and sets the environment with reference to the information stored in the script file generated in the script file generating portion 540.

Figure 6:
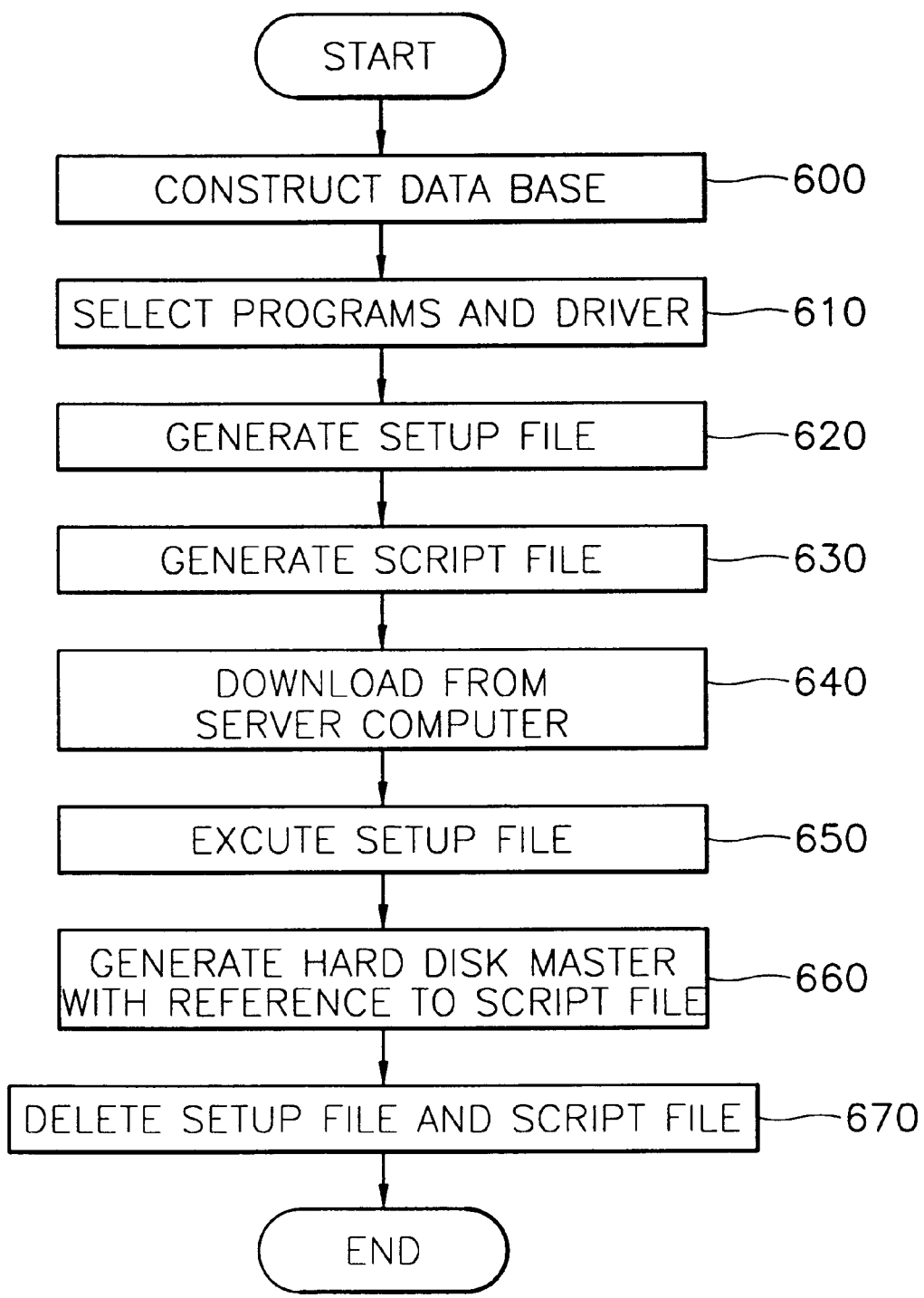
FIG. 6 is a flowchart showing a method for manufacturing a hard disk using the system for manufacturing the hard disk master.

The operation of the present invention will be described with reference to the above-mentioned structure. FIG. 6 is a flowchart showing a method for manufacturing a hard disk master using the hard disk master manufacturing system. First, the data base 510 is constructed in the hard disk master manufacturing system according to the present invention (step 600). The programs and drivers required by the hard disk master are selected through the user interfacing portion 520 and are stored in an additional reference directory as shown in FIG. 7 (step 610). A setup file, in which information on the list of the programs and drivers and the order in which they are installed is stored, is generated in the setup file generating portion 530 (step 620). Then, a script file is generated in the script file generating portion 540 in order to set the hardware for operating the programs and drivers of the hard disk master to be manufactured and the operating conditions (step 630). Then, the process of downloading from the server computer 500 takes place (step 640).

More specifically, as shown in FIG. 8, the client computer 550 logs in on the server computer 500 (step 800), searches for the reference directory, and connects it to a specific drive (Z drive) (step 810). The client computer 550 then copies the programs and drivers stored in the reference directory of the server computer 500, the setup file generated in the setup file generating portion 530, and the script file generated in the script file generating portion 540 through the downloading portion 560 (step 820). Then, a log out is performed (step 830).

When the down-loading is complete, the setup file shown in FIG. 9 is executed, programs are installed in a predetermined order according to the information stored in the setup file, and the environment is set with reference to the script file (xxx.scp) (step 660). When the hard disk master is generated as mentioned above, the setup file and script file are deleted (step 670).

According to the present invention, it is possible to reduce the probability of generating errors during the manufacturing of the hard disk master by manual work, and to effectively manage the programs and drivers stored in the hard disk master.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A hard disk master manufacturing system for manufacturing a hard disk master, comprising:
   a server computer for storing programs and drivers to be stored in a hard disk; and
   a client computer for logging in on the server computer and for downloading programs and drivers required by the hard disk master from the server computer so as to generate the hard disk master;
   wherein said server computer comprises:
      program storing means for storing programs and drivers;
      user interfacing means for use by a user in selecting the programs and drivers required by the hard disk master from among the programs and drivers stored in the program storing means, and for storing the selected programs and drivers;
      setup file generating means for generating information relative to the programs selected through the user interfacing means and an order in which the programs and drivers are installed, and establishing said information as a setup file; and
      script file generating means for generating information on the setting of a hardware environment and operating conditions in order to operate the selected programs and drivers.

2. The hard disk master manufacturing system of claim 1, wherein said client computer comprises:
   downloading means for logging in on the server computer, and for downloading the selected programs and drivers stored by the user interfacing means and the setup file generated by the setup file generating means; and
   hard disk master generating means for sequentially installing the programs and drivers required by the hard disk master by executing the setup file.

3. The hard disk master manufacturing system of claim 1, wherein said program storing means comprises a data base for storing and managing the programs and drivers.

4. The hard disk master manufacturing system of claim 2, wherein said script file generating means establishes said information on the setting of the hardware environment and the operating conditions as a script file;
   wherein said downloading means of the client computer further downloads the script file generated by the script file generating means; and
   wherein said hard disk master generating means further sets the environment with reference to the information stored in the script file generated by the script file generating means.

5. A method for manufacturing a hard disk master in a hard disk master manufacturing system which includes a server computer for storing programs and drivers to be stored in the hard disk and a client computer for generating the hard disk master by logging in on the server computer, the method comprising the steps of:
   selecting the programs and drivers required by the hard disk master from among the programs and drivers stored in the server computer, and storing the selected programs and drivers;
   generating information relative to the selected programs and drivers and an installation order of the selected programs and drivers, and establishing said generated information as a setup file;
   generating environment setting information for setting a hardware environment and operating conditions of the selected programs and drivers, and establishing said generated information as a script file;
   downloading the selected programs and drivers, the setup file, and the script file from the server computer via a network to the client computer; and
   generating a hard disk master by executing the setup file, installing the programs and drivers in a predetermined order, and setting the environment of the programs and drivers in the client computer in accordance with the hardware environment and operating conditions with reference to the script file.

6. The method of claim 5, further comprising the step of deleting the setup file and the script file after the completion of the step of generating the hard disk master.

7. The method of claim 5, wherein said downloading step comprises searching for a specific reference directory, copying contents of the specific reference directory, and logging out.

8. A hard master manufacturing system for manufacturing a hard disk master, comprising:

a client computer having a hard disk;

server means connected to said client computer via a network for storing programs and drivers to be stored in the hard disk of the client computer;

logging means located in the client computer for logging in on the server means via the network; and downloading means located in the client computer for downloading programs and drivers required by the hard disk master from the server means via the network so as to generate the hard disk master;

wherein said server means comprises a user interfacing portion for use by a user in selecting the programs and drivers required by the hard disk master from among the programs and drivers stored in the server means and for storing the selected programs and drivers.

9. The hard disk master manufacturing system of claim 8, wherein said server means comprises a program storing portion for storing programs and drivers.

10. The hard disk master manufacturing system of claim 8, wherein said server means further comprises a set up file generating portion for generating information relative to the programs selected by the user and an order in which the programs and drivers are to be installed, and for establishing said information as a setup file.

11. The hard disk master manufacturing system of claim 8, wherein said server means further comprises a script file generating portion for generating a script file comprising information on setting of a hardware environment and operating conditions for operation of the programs and drivers selected by the user.

12. The hard disk master manufacturing system of claim 8, wherein said client computer comprises a downloading portion for logging in on the server computer and for downloading the programs and drivers selected by the user as stored in said server means, and a set up file generated in said server means.

13. The hard disk master manufacturing system of claim 8, wherein said client computer comprises a hard disk master generating portion for sequentially storing the programs and drivers required by the hard disk master by executing a setup file generated in said server means.

14. The hard disk master manufacturing system of claim 8, wherein said server means further comprises a program storing portion for storing the programs and drivers, said program storing portion comprising a data base for storing and managing the programs and drivers.

15. The hard disk master manufacturing system of claim 8, wherein said server means further comprises a script file generating portion which establishes information on setting of a hardware environment and operating conditions, said information being established as a script file.

16. The hard disk master manufacturing system of claim 8, wherein said client computer comprises a downloading portion for downloading a script file generated in said server means.

17. The hard disk master manufacturing system of claim 8, wherein said client computer comprises a hard disk master generating portion for setting an environment with reference to information stored in said server means.

18. A hard master manufacturing system for manufacturing a hard disk master, comprising:

a client computer having a hard disk;

server means connected to said client computer via a network for storing programs and drivers to be stored in the hard disk of the client computer;

logging means located in the client computer for logging in on the server means via the network; and downloading means located in the client computer for downloading programs and drivers required by the hard disk master from the server means via the network so as to generate the hard disk master;

wherein said server means comprises a script file generating portion for generating a script file comprising information on setting of a hardware environment and operating conditions for operation of programs and drivers selected by a user.

19. The hard disk master manufacturing system of claim 18, wherein said server means further comprises a set up file generating portion for generating information relative to programs selected by a user and an order in which the programs and drivers are to be installed, and for establishing said information as a setup file.

20. The hard disk master manufacturing system of claim 18, wherein said client computer comprises a downloading portion for logging in on the server computer and for downloading programs and drivers selected by a user as stored in said server means, and a set up file generated in said server means.

* * * * *